United States Patent [19]

Smith, III

[11] Patent Number: 4,462,076
[45] Date of Patent: Jul. 24, 1984

[54] VIDEO GAME CARTRIDGE RECOGNITION AND SECURITY SYSTEM

[75] Inventor: Jay Smith, III, Pacific Palisades, Calif.

[73] Assignee: Smith Engineering, Culver City, Calif.

[21] Appl. No.: 384,906

[22] Filed: Jun. 4, 1982

[51] Int. Cl.³ .............................................. G06F 1/00
[52] U.S. Cl. .................................................. 364/200
[58] Field of Search ... 364/200 MS File, 900 MS File

[56] References Cited

U.S. PATENT DOCUMENTS 4,120,030 10/1978 Johnstone .......................... 364/200

Primary Examiner—Raulfe B. Zache
Attorney, Agent, or Firm—Jackson, Jones & Price

[57] ABSTRACT

A security system for ascertaining the authenticity of removable video game cartridges adapted to interface with a video game system having a CPU. The system includes the comparison of the contents of predetermined addresses in the memory unit of the game cartridges with a security message stored in the CPU, and the rejection of the cartridge unless the contents of these predetermined memory locations are the same as the security message. The system further includes means for displaying a proprietary notice message to the operator of the video game system before substantive interfacing between the CPU and remote software unit occurs. Control over game operation will occur only if the CPU recognizes the cartridge as an authorized unit.

17 Claims, 2 Drawing Figures

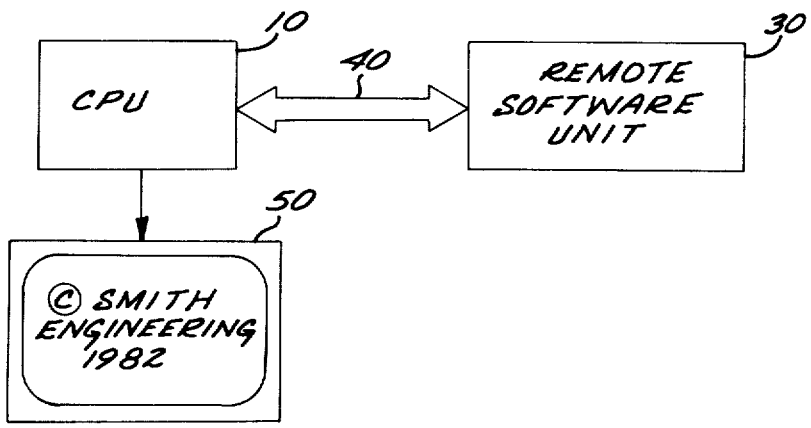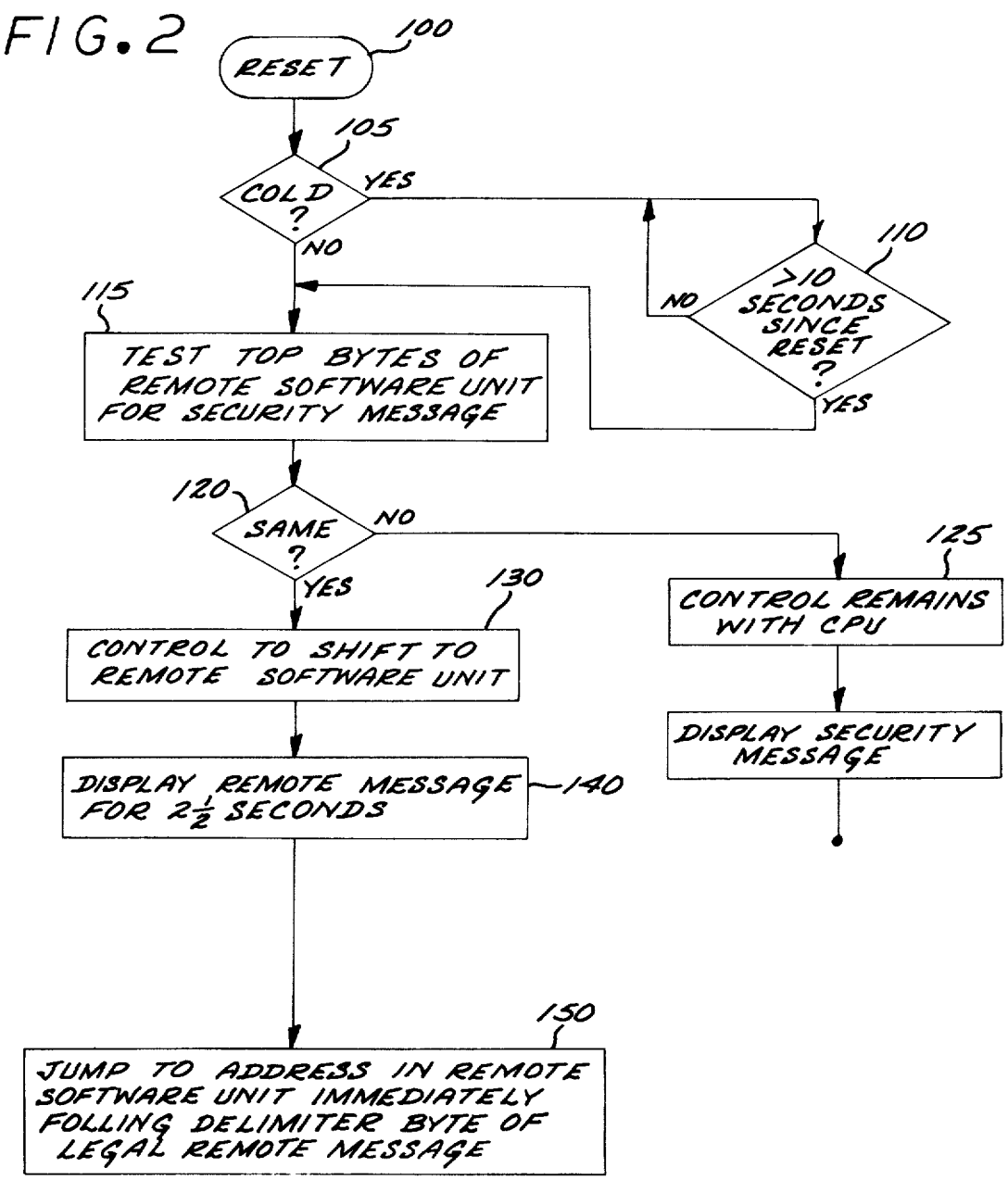

VIDEO GAME CARTRIDGE RECOGNITION AND SECURITY SYSTEM

BACKGROUND OF THE INVENTION

1. Field of the Invention

The field of this invention is security systems for video games interfacing with removeable ROM cartridges with program data and program instruction, such as, for example, systems for recognizing and displaying a security message stored in a ROM cartridge used with arcade-type video games and the like.

2. Background and Summary of the Invention

With the advent of miniaturized computing elements such as microcomputers and microprocessors, there has been a tremendous proliferation in the marketplace of products which utilize or perform computational or logic functions, such as, for example, calculators, personal computers, minicomputers, home video game apparatus, and so on. Typically these products utilize a central processing unit ("CPU") and proprietary software developed for general or specific applications.

It has become commonplace for the manufacturer of the product or another vendor to develop additional software useable with the original product to extend its capacity or to adapt the product to other applications. One typical way of interfacing the new software is to mount memory elements, e.g., read only memory (ROM) circuits on plug-in circuit boards. The circuit boards may couple the memory elements, for example, to the data and address busses of the product CPU.

In many applications, the market for the additional software is highly lucrative, and indeed may be more profitable than sales of the original product. For the manufacturer who has invested heavily in the development of the initial product, his success in the product venture may well depend upon his ability to successfully develop and market proprietary software useable with his product. All too often, however, other vendors develop additional software for the product or even copy the propriatary software and capture the supplemental software market, unburdened as they are with heavy development expenses in the hardware and initial software.

The present invention is directed to the problems associated with the prevention of use of unauthorized supplemental or remote software systems with the product or CPU. It is, therefore, an object of the present invention to provide a security system for securing a CPU from interface with an unauthorized data or instruction source.

Another object of the invention is to provide a security system which is simple, yet relatively secure from breach.

It is another object to the invention to subject unauthorized vendors who are able to breach the security systems to violations of law governing copyright, unfair competition and the like.

It is yet another object of the present invention to provide a security system in which program control does not shift from the CPU until and unless the authenticity of the supplemental software has been verified.

Another object of the present invention is to provide a security system for a video game apparatus adapted to receive game cartridges, whereby only authorized software is recognized by the game apparatus.

These and other objects have been achieved by the present invention. The security system of the present invention comprises means for storing a security message in the CPU, means for addressing the contents of predetermined address locations in the supplemental software, means for comparing the contents of these predetermined locations with the security message to determine whether identity exists, and means responsive to the comparison results for causing the CPU to ignore the supplemental software unless identity exists between the security code and the contents of the predetermined address locations in the supplemental software. The security system further includes means for displaying or otherwise publishing the security message to an operator or the like.

In the preferred embodiment, the security message comprises a copyright notice, including a copyright symbol © and copyright proprietor of authorized supplemental software. Vendors of unauthorized supplemental software must, therefore, include data at predetermined address locations which will be recognized and published as the copyright notice of the authorized vendor. The unauthorized vendor must, therefore, not only breach the security system, but also publish a misrepresentation that its work is authorized and that the copyright resides in the authorized vendor.

BRIEF DESCRIPTION OF THE DRAWINGS

FIG. 1 is a simplified block diagram illustrating the general interfacing of the CPU, remote software unit and display device as used in the preferred embodiment.

FIG. 2 is a simplified flow chart illustrating the security algorithm as used in the preferred embodiment.

DETAILED DESCRIPTION OF THE PREFERRED EMBODIMENTS

The preferred embodiment of the present invention comprises a novel security system for detecting authorized supplemental software components. particularly adapted to video game apparatus adapted to receive plug-in game cartridges having stored in memory program instructions and data adapted to the play of the particular game. The following description is provided to enable any person skilled in the art to make and use the invention. Various modifications to the preferred embodiments will be readily apparent to those skilled in the art, and the generic principles defined herein will be applicable to other embodiments. Thus, the invention is not intended to be limited to the embodiments shown herein, but is to be accorded the widest scope consistent with the principles and novel features disclosed herein.

A principle application presently contemplated for the security system described herein is a home video game application. These video game apparatus typically comprise a CPU (typically comprising a microprocessor) with the necessary pheripheral circuitry to interface with a CRT or TV display. The apparatus is adapted to receive a plug-in circuit board or "cartridge" which includes a ROM, including supplemental game memory and program instructions for the play of a particular video game. For some apparatus on the market today, such as the Atari Video Computer System, an external cartridge is required to play any video game with the video apparatus, there being no game program information being provided "on-board" the system. Thus, the basic CPU assembly may be used with any number of cartridges which provide alternative game options and the like. Exemplary of a video arcade game apparatus also adapted to the use of supplemental software cartridges is that disclosed in copending U.S. patent application Ser. No. 337,215, filed on Jan. 6, 1982, and entitled "Self-Contained Arcade Game Apparatus and Method for Object Generation."

The present invention is, of course, adaptable for use in many other applications, such as programmable calculators and time-share computer systems and home computer systems which may be adapted to interact with supplemental software systems.

Before proceeding further, definitions will be provided of certain terms which shall be used in this specification and the appended claims. Central processing unit ("CPU") will describe the central processing hardware and software apparatus which provides the primary or initial processing capability. "Remote software unit" means a unit which may interface with the CPU and even override the function of the CPU. The remote software unit might include its own processing or computing hardware and/or software unit having similar or greater capabilities than the CPU.

Referring now to FIG. 1, a block diagram is shown illustrating the connection of the CPU 10 and remote software unit 30 through bus 40. CRT display device 50 is controlled by CPU 10. Exemplary of the actual hardware which might be used for these elements in a home video game application are the Motorola MC-6809 microprocessor as a CPU, and a mask programmed ROM such as the Intel 2332, having 32k bits of memory. The display 50 may be a conventional television receiver, or a dedecated CRT display such as is disclosed in the above-referenced co-pending application.

Upon start-up or reset, the CPU 10 is configured to perform a security check to determine if an authentic remote software unit 30 is connected on bus 40 with the CPU. In the preferred embodiment, the remote software unit 30 has been assigned hexidecimal addresses 0-7FFF from the CPU memory map. The security system is of course capable of concurrently interfacing with and verifying the authenticity of more than one remote software unit, by assigning other memory locations in the CPU memory map to second, third and other remote units, if the particular application requires the concurrent use of such additional capacity.

Predetermined locations assigned to remote software unit 40 are addressed and their contents compared with the security message to ascertain the existence of identity. In the preferred embodiment, the security message must be stored in the remote software unit commencing at address location 0000. The length of the security message may be left to the discretion of the system designer in accordance with the demands of the particular application. As the number of bits comprising the security message increases, so does the number of permutations of possible different messages and hence the difficulty of defeating the security system is also increased.

One aspect of the present invention is that the identity of the particular location of the security message in unit 40 forms part of the security. With a randomly asscessible memory, such as the read only memory, having individually accessible memory locations, the security message may be located virtually anywhere within unit 40. Of course, magnetic tape or disc could be used as the storage medium, with the security message being disposed at an easily defineable location thereon, such as the beginning of the tape.

Another aspect of the security system of the present invention is that control over execution of program instructions may leave the CPU only after the authenticity of the remote software unit has been verified. Thus, the CPU includes a security algorithm which is entered under predetermined conditions, e.g., upon start-up of the CPU or upon reset. During the security algorithm, the contents of predetermined memory locations in the remote software unit 40 are compared with the contents of other memory locations (e.g., in memory within the CPU) at which the security message is stored. Only if the contents of the predetermined memory locations in unit 40 are identical with the stored security message will the CPU recognize the remote software unit as authentic. This recognition result may take many different forms, depending upon the user's requirements.

In the preferred embodiment, once the authenticity of unit 40 has been verified and the security algorithm completed, the CPU shifts control to unit 40 by branching to an address location in unit 40 for the next instruction to be executed; unit 40 also stores additional data. Unit 40 could also be used simply to provide additional data to CPU 10, without control over system operation being passed to unit 40. For a video game application, of course, unit 40 includes a game instruction program as well as data to be used in defining game objects and the like.

Another aspect of the present invention lies in the content of the security message. As heretofore set forth, a principle application of the present invention lies in the applications wherein the authentic remote software unit contains software which is proprietary either to the manufacturer of CPU 10 or to an authorized vendor. It is expected that such software will be subject to copyright protection under the copyright laws of the United States as well as other countries. Therefore, the security message may be defined as the statutory copyright notice or a portion thereof. In the preferred embodiment, the security message comprises the copyright notice © and the name of the copyright proprietor. The year of origination of the software does not form a part of the security message, since it is recognized that the authorized proprietor may develop authorized software in more than one specific year.

This facet of the invention includes the display of the security message once the remote software unit has been recognized as authentic. In the preferred embodiment, the authorized remote software unit 40 is configured so that the security message includes the origination year date as well as the copyright symbol and name of the copyright proprietor. The CPU 10 is configured such that the requisite security message includes only the copyright symbol and proprietor identification, but the entire copyright notice stored in Unit 40, including date, will be displayed by display 50 for a predetermined time interval prior to the passing of program control from CPU 10 to remote software unit 40. Although in the preferred embodiment the message is displayed for a 2½ second interval, this could well be increased to any interval required by the application. A 30 second interval would be an even more effective deterrent to unauthorized software vendors.

This facet of the invention recognizes the possibility that someone may ascertain, albeit by some unauthorized or illegal means, the requisite security message as well as the predetermined address locations at which the security message must be stored in the remote software unit 40. Yet, by choosing and displaying a security message which comprises the copyright notice identifying the copyright proprietor as the authorized vendor, the security system of the present invention requires that a representation be made to the system operator that the software of unit 40 is the copyrighted property of the authorized vendor. Unless the vendor is indeed authorized, the vendor of unauthorized units will have misrepresented to the user that he is an authorized vendor, thus subjecting such vendor to risk of violation of the law respecting copyright and/or unfair competition or illegal trade practices.

This aspect of the invention is, of course, not limited to security messages which comprise a copyright notice. The security message could comprise any proprietary notice, or other legend calculated to increase the risk of legal sanctions due to vending unauthorized remote software units.

In some applications, it may be necessary to ensure that the display of the security message is not defeated by having other data displayed to obscure or obliterate the message from the operator's view. Suitable software may be provided in the CPU to ensure that other data is not written over the security message during its display. Provision of such software is well within the purview of one skilled in the art.

Implementation of the above described security system may be accomplished by any variety of software/hardware means. In the preferred embodiment, the CPU is programmed to enter a security algorithm under predetermined conditions, such as the "cold" start-up of the CPU, or upon a reset by the operator. A simplified flow chart illustrating the basic steps of the security algorithm is shown in FIG. 2. Other steps not essential to the security system may also be included in the algorithm depending upon the application. For example, in a video game application, the title of the particular game and other data might as well be displayed during the algorithm.

Referring now to FIG. 2, the algorithim commences at step 100, with a "reset". Step 105 is a decision to determine whether the "reset" is a "cold" reset, i.e., whether the CPU has just been powered up. If the reset is "cold", a ten second delay occurs at step 110 to allow the CPU 10 and display 50 circuits to initialize and stabilize.

At step 115, a comparison is made between the contents of the predetermined address locations of unit 40 and the stored security message. Step 120 is a decision point dependent upon the comparison results. If the comparison results in a determination that the contents of the address locations are not the same as the security message, then program control remains in the CPU (step 125). If the comparison at step 115 is positive, then program control will shift to the remote software unit 40 (step 130). At steps 140 and 145, the message stored in the remote software unit 140 is displayed on display 50 for two and one-half seconds. At step 150, the security algorithm ends with a jump to the address in unit 40 immediately following the message end delimiter byte delimiting the end of the message in unit 40.

A copy of the source code listing of the security algorithm used in the preferred embodiment is set forth in Table 1. A copy of the source code listing of the pertinent portion of a remote software unit in accordance with the preferred embodiment is set forth in Table 2. The code "$67 GCE 1982 $80" comprises the remote message stored in unit 40 with $67 comprising the code representation of the copyright symbol, "GCE" representing the name of an authorized vendor, and "$80" comprising the delimiter indicating the end of the remote message. The security message comprises the message "$67 GCE - - - - $80". Thus, the security algorithm ignores the four "blanks" immediately following "GCE". The particular instructions used in Table 1 and 2 are described in the MC6809 programming manual, "MC6809-68099E Microprocessor Programming Manual ", Motorola, Inc. 1981. The actual means of decoding the message representations and displaying the message per se forms no part of rhe present invention, and will not be described further herein.

TABLE 1

| | | | | | |
|---|---|---|---|---|---|
| F000 | | | ORG | ROMS | |
| F000 | | WARM | | | |
| F000 | 10CECBEA | POWER | LDS | #STACK | ;AT RESET |
| F004 | BDF18B | | JSR | INITALL | ;BRING UP HWARE, BRANCH IF WARM |
| F007 | CC7321 | | LDD | #$7321 | ;CHECK WARM OR CLOD BOOT |
| F00A | 10B3CBFE | | CMPD | JRES | |
| F00E | 275C | | BEQ | WARME | |
| F010 | FDCBFE | | STD | JRES | ;START COLD BOOT. CONSISTS OF: |
| F013 | 7CC83B | | INC | LEG | ;(1) PLAY STARTUP TUNE 'VCTRX' |
| F016 | | | | | ;DISPLAY START MESSAGE |
| F016 | | | | | ;(2) TIMEOUT 13 SEC INTO WARM BOOT |
| F016 | BECBEB | | LDX | #HEIGH | |
| F019 | BDF84F | | JSR | SCLR | ;CLR HI SKOR IF COLD |
| F01C | BDF1AF | CLOD | JSR | DPRAM | ;SOUND |
| 00C8 | | | SETDP | $C8 | |
| F01F | DC25 | | LDD | FRAME | |
| F021 | 10830101 | | CMPD | #$101 | ;WAIT FOR START OF TUNE |
| F025 | 2602 | | BNE | MFIZZ | |
| F027 | D756 | | STB | TSTAT | ;(B MUST BE POS) |
| F029 | 57 | MFIZZ | ASRB | | |
| F02A | C403 | | ANDB | #3 | |
| F02C | 8EF0FD | | LDX | #DABLE | |
| F02F | E685 | | LDB | B, X | |
| F031 | D729 | | STB | DASH | |
| F033 | C602 | | LDB | #2 | |
| F035 | D724 | | STB | ZGO | ;PREPARE DASH LOOP |
| F037 | CEFD0D | | LDU | #VCTRX | ;WILL START IF TSTAT=POS NZRO |
| F03A | BDF687 | | JSR | REPLAY | |
| 00D0 | | | SETDP | $D0 | |
| F03D | BDF192 | DONO | JSR | FRAM20 | |
| F040 | BDF289 | | JSR | REQOUT | |
| F043 | BDF2A9 | | JSR | INTMAX | |

TABLE 1-continued

| | | | | | |
|---|---|---|---|---|---|
| F046 | B6C826 | | LDA | FRAME+1 | ;BLINK TITLE |
| F049 | CEF10C | | LDU | #MCOLD | |
| F04C | 8520 | | BITA | #$20 | |
| F04E | 2702 | | BEQ | ONBABY | |
| F050 | 334C | | LEAU | 12, U | |
| F052 | BDF385 | ONBABY | JSR | TEXSIZ | |
| F055 | 8EF0E9 | | LDX | #DOSH | ;DISPLAY TITLE BLOCK |
| F058 | BDF308 | RETIRE | JSR | POSIT2 | |
| F05B | 8603 | | LDA | #3 | |
| F05D | BDF434 | | JSR | DASHEL | |
| F060 | 7AC824 | | DEC | ZGO | |
| F063 | 26F3 | | BNE | RETIRE | |
| F065 | D6C825 | | LDA | FRAME | |
| F068 | 8101 | | CMPA | #1 | ;FOR 10 SEC TIMEOUT |
| F06A | 23B0 | | BLS | CLOD | |
| F06C | | | | | |
| 00C8 | | WARME | SETDP | $C8 | |
| F06C | BDF1AF | | JSR | DPRAM | |
| F06F | 86CC | | LDA | #$CC | |
| F071 | 9729 | | STA | DASH | |
| F073 | CCF101 | | LDD | #SECRET | |
| F076 | DD39 | | STD | COSINE | ;FOR LEGAL |
| F078 | 0F25 | | CLR | FRAME | |
| F07A | 0F26 | | CLR | FRAME+1 | |
| F07C | CE0000 | | LDU | #CARTS | |
| F07F | 8EF101 | | LDX | #SECRET | |
| F082 | C60B | | LDB | #$0B | ;IGNORE DATE, WHERE B=5, 4, 3, 2 |
| F084 | A6C0 | ESCAPE | LDA | 0, U+ | ;TEST FOR CART PRESENT |
| F086 | A180 | | CMPA | 0, X+ | |
| F088 | 270D | | BEQ | WARMER | |
| F08A | C101 | | CMPB | #1 | |
| F08C | 2704 | | BEQ | REKKED | |
| F08E | C105 | | CMPB | #5 | |
| F090 | 2305 | | BLS | WARMER | |
| F092 | CEE000 | REKKED | LDU | #INHOUS | |
| F095 | 2007 | | BRA | WARMEST | |
| F097 | 5A | WARMER | DECB | | |
| F098 | 26EA | | BNE | ESCAPE | |
| F09A | D739 | | STB | COSINE | ;INDICATE CART SELECTED |
| F09C | D73A | | STB | COSINE+1 | |
| F09E | 0C56 | WARMEST | INC | TSTAT | ;PICK UP TUNE START |
| F0A0 | DF37 | | STU | SINE | |
| F0A2 | EEC4 | | LDU | 0, U | |
| F0A4 | BDF1AF | WARMLY | JSR | DPRAM | ;GAME TITLE LOOP |
| F0A7 | CCF848 | | LDD | #$F848 | ;SET LEAGL SIZ |
| F0AA | DD2A | | STD | SIZRAS | |
| F0AC | BDF687 | | JSR | REPLAY | |
| F0AF | BDF192 | | JSR | FRAM20 | |
| F0B2 | BDF289 | | JSR | REQOUT | |
| F0B5 | BDF2A9 | | JSR | INTMAX | |
| F0B8 | CCC0C0 | | LDD | #$C0C0 | |
| F0BB | FEC839 | | LDU | >COSINE | |
| F0BE | BDF37A | | JSR | POSDRAS | ;DISPLAY LEGAL MESS |
| F0C1 | B6C83B | | LDA | >LEG | |
| F0C4 | 260C | | BNE | NEIGH | ;NOT ON COLD BOOT |
| F0C6 | 4A | | DECA | | |
| F0C7 | CECBEB | | LDU | #HEIGH | |
| F0CA | A746 | | STA | 6, U | ;BE SURE DELIM IN PLACE |
| F0CC | CC68D0 | | LDD | #$68D0 | ;START HIGH SCORE DISPLAY |
| F0CF | BDF37A | | JSR | POSDRAS | |
| F0D2 | FEC837 | NEIGH | LDU | >SINE | ;GAME TEXT |
| F0D5 | 3342 | | LEAU | 2, U | |
| F0D7 | BDF385 | | JSR | TEXSIZ | |
| F0DA | B6C856 | | LDA | >TSTAT | ;WAIT FOR TUNE END |
| F0DD | 26C5 | | BNE | WARMLY | |
| F0DF | BEC825 | | LDX | >FRAME | ;WAIT AT LEAST 2.5 SEC |
| F0E2 | 8C007D | | CMPX | #125 | |
| F0E5 | 23BD | | BLS | WARMLY | |
| F0E7 | 6E41 | | JMP | 1, U | ;OFF TO CART OR SCHWEEPEH |
| F0E9 | 40D6 | DOSH | DW | $40D6 | ;POSITION OF BLOCK |
| F0EB | 0056810000 | | DW | $0056, $8100, $00A9, $7E00 | ;(DASHED LINES) |
| F0F3 | 39DC | | DW | $39DC | ;SMALLER DASHES, OPPOSITEE DIR |
| F0F5 | 8E00004A72 | | DW | $8E00, $004A, $7200, $00B6 | |
| F0FD | E0380E03 | DABLE | DB | $E0, $38, $0E, $03 | ;FOR MOVIE PATTERN |
| F101 | | | | | |
| F101 | 6720474345 | SECRET | DB | $67, 'GCE 1982', $80 | |
| F10C | F16027CF | MCOLD | DW | $F160, $27CF | ;DUBL INTENSITY VECTREX |
| F110 | 5645435452 | | DB | 'VECTREX', $80 | |
| F118 | F36026CF | MBOLD | DW | $F360, $26CF | |
| F11C | 5645435452 | | DB | 'VECTREX', $80 | |
| F124 | FC60 | SACRET | DW | $FC60 | |
| F126 | DFE9 | | DW | $DFE9 | ;SECND |

TABLE 1-continued

| | | | | |
|---|---|---|---|---|
| F128 | 47434580 | DB | 'GCE', $80 | |
| F12C | FC38 | DW | $FC38 | |
| F12E | CCD1 | DW | $CCD1 | |
| F130 | 454E544552 | DB | 'ENTERTAINING', $80 | |
| F13D | | | | |
| F13D | FC38 | DW | $FC38 | |
| F13F | BCDC | DW | $BCDC | |
| F141 | 4E45572049 | DB | 'NEW IDEAS', $80 | |
| F14B | 00 | DB | 0 | ;END OF TEXT PACKET |

TABLE 2

| | | | | |
|---|---|---|---|---|
| 0000 | | ORG | $0000 | |
| 0000 | | | | |
| 0000 | | | | ;beginning data for use by RUM |
| 0000 | 6720474345 | DB | $67, 'GCE 1982', $80 | ;the secret message |
| 000D | FD81 | DW | ARMOR | ;address of data for tune |
| 000D | F850 | DW | $F850 | ;to control size of raster message following |
| 000F | 20C0 | DW | $20C0 | ;position (y, x) of raster message following |
| 0011 | 44454D4F4E | DB | 'DEMONSTRATION',$80, $00 | ;message, message delimiter, text packet delimeter |
| 0020 | | ;control comes to the address immediately following the data sequence | | |
| 0020 | | ;$80, $00 above (here labeled INIT1) after RUM title page | | |
| 0020 | | ;there are no further limitations on the code | | |

What is claimed is:

1. In a video game system having means for displaying a game including a central processing unit (CPU); a display screen; means for accepting operator instructions in response to game play, and means for receiving remote software units storing one or more video games, the improvement comprising:
   a removable software unit including a first memory unit having a plurality of addressable memory locations, predetermined locations of the memory locations being encoded with a first set of specific information signals for displaying a proprietary visual display at separate discrete and independent locations on the display screen and other memory locations being encoded with specific information signals capable of operating the video game system for the visual display of the game;
   means for identifying the contents of said predetermined locations of said remote software unit and verifying said first set of information signals as acceptable to the CPU;
   means for requiring the proprietary visual display to be shown for a predetermined time period after acceptance by the CPU; and
   means for passing control of the video game system from the CPU to the removable software unit only after verification and display of the proprietary visual display on the display screen.

2. The improvement of claim 1 wherein said removable software unit comprises a randomly accessible memory means.

3. The improvement of claim 1 wherein said means for verifying said information signals as acceptable to the CPU includes a first set of security signals comprising a security message stored in a second memory unit, and means for comparing said first set of information signals with said security message to determine identity.

4. The improvement of claim 3 wherein said proprietary visual display includes a copyright symbol, and the name of the copyright proprietor.

5. The improvement of claim 2 wherein said CPU comprises microprocessor means, said randomly accessible memory means comprises a read only memory coupled to said CPU.

6. A software security system, comprising:
   a central processing unit (CPU);
   a remote software unit, adapted to interface with said CPU and including a memory unit having a plurality of addressable memory locations;
   said CPU adapted to address predetermined locations of said remote software unit and compare the contents of said locations with a security message accessible to said CPU, said CPU adapted to recognize said remote software unit as authentic if said contents of said predetermined memory locations are identical with said security message, said CPU adapted to reject said remote software unit unless identity is recognized.

7. The security system of claim 6 further comprising display means, said display means coupled to said CPU; and adapted to display in decoded form said contents of said predetermined memory locations.

8. The security system of claim 7 wherein said CPU is adapted to display the contents of said memory locations only when said CPU recognizes identity between said security message and said contents of said predetermined memory locations.

9. The security system of claim 8 wherein said security message represents a proprietary message.

10. The security system of claim 9 wherein said proprietary message includes a copyright notice.

11. The security system of claim 10 wherein said proprietary message further includes the identity of an authorized copyright proprietor.

12. The security system of claim 11 wherein said remote software terminal comprises a randomly accessible memory means (RAM) disposed in a cartridge.

13. The security system of claim 12 wherein said CPU comprises microprocessor means, and said RAM is adapted to be addressed over an address bus by said CPU.

14. The security system of claim 6 wherein said CPU is adapted to pass control to said remote software unit only after said CPU recognizes said remote software unit as authentic.

15. The security system of claim 14 wherein program instructions are stored in memory locations in said remote software unit, and said CPU is arranged to execute said program instructions only after said CPU recognizes said remote software unit as authentic.

16. The security system of claim 15 wherein said CPU is arranged to display said contents for a predetermined time interval prior to passing control to said remote software unit.

17. The security system of claim 6 wherein a plurality of security messages are accessible to said CPU, and said CPU is adapted to recognize said remote software unit as authentic if said content and said predetermined memory locations are identical with any one of said plurality of security messages.

* * * * *